US011066596B2

(12) United States Patent
Xu et al.

(10) Patent No.: US 11,066,596 B2
(45) Date of Patent: Jul. 20, 2021

(54) BUFFERED FRICTION REDUCER FOR SUBTERRANEAN OPERATIONS

(71) Applicant: Multi-Chem Group, LLC, San Angelo, TX (US)

(72) Inventors: Liang Xu, The Woodlands, TX (US); Paul Lord, Cypress, TX (US); Scott Gale, Spring, TX (US)

(73) Assignee: Multi-Chem Group, LLC, Houston, TX (US)

( * ) Notice: Subject to any disclaimer, the term of this patent is extended or adjusted under 35 U.S.C. 154(b) by 33 days.

(21) Appl. No.: 16/305,340

(22) PCT Filed: Jul. 15, 2016

(86) PCT No.: PCT/US2016/042520
§ 371 (c)(1),
(2) Date: Nov. 28, 2018

(87) PCT Pub. No.: WO2018/013134
PCT Pub. Date: Jan. 18, 2018

(65) Prior Publication Data
US 2020/0048533 A1 Feb. 13, 2020

(51) Int. Cl.
*C09K 8/68* (2006.01)
*C09K 8/60* (2006.01)
(Continued)

(52) U.S. Cl.
CPC ............... *C09K 8/68* (2013.01); *C09K 8/602* (2013.01); *C09K 8/665* (2013.01); *C09K 8/80* (2013.01);
(Continued)

(58) Field of Classification Search
CPC .......... C09K 8/685; C09K 8/68; C09K 8/665; C09K 8/90; C09K 8/52; C09K 8/80;
(Continued)

(56) References Cited

U.S. PATENT DOCUMENTS

2009/0298721 A1  12/2009  Robb et al.
2012/0157354 A1   6/2012  Li et al.
(Continued)

FOREIGN PATENT DOCUMENTS

CN   103589416 A   2/2014
CN   105229112 A   1/2016
(Continued)

OTHER PUBLICATIONS

International Search Report and Written Opinion issued in related PCT Application No. PCT/US2016/042520 dated Apr. 11, 2017, 12 pages.
(Continued)

*Primary Examiner* — Zakiya W Bates
(74) *Attorney, Agent, or Firm* — Tenley Krueger; Baker Botts L.L.P.

(57) ABSTRACT

Systems and methods having friction reducer compositions for use in subterranean treatment fluids are presented. An embodiment is a method comprising: (A) forming a treatment fluid comprising: an aqueous base fluid, a friction reducer, and an alkaline buffering agent, wherein the treatment fluid has a pH in the range of about 7 to about 10; and (B) injecting the treatment fluid into a wellbore penetrating at least a portion of a subterranean formation at a pressure sufficient to create or enhance one or more fractures within the subterranean formation.

14 Claims, 2 Drawing Sheets

(51) Int. Cl.
*C09K 8/66* (2006.01)
*C09K 8/80* (2006.01)
*E21B 43/26* (2006.01)
*E21B 43/267* (2006.01)

(52) U.S. Cl.
CPC .......... *E21B 43/26* (2013.01); *C09K 2208/28* (2013.01); *E21B 43/267* (2013.01)

(58) Field of Classification Search
CPC ...... E21B 43/267; E21B 43/26; E21B 21/003; E21B 43/25
See application file for complete search history.

(56) References Cited

U.S. PATENT DOCUMENTS

| | | | |
|---|---|---|---|
| 2013/0056215 A1* | 3/2013 | Crews | B22F 1/02 166/310 |
| 2013/0130942 A1* | 5/2013 | Dobson, Jr. | C09K 8/08 507/116 |
| 2013/0206398 A1 | 8/2013 | Tufano et al. | |
| 2013/0274149 A1 | 10/2013 | Lafitte et al. | |
| 2014/0000896 A1 | 1/2014 | Wang et al. | |
| 2014/0080172 A1* | 3/2014 | Tunheim | G01N 21/272 435/34 |

FOREIGN PATENT DOCUMENTS

| | | |
|---|---|---|
| CN | 105669895 A | 6/2016 |
| WO | 2011/031920 A2 | 3/2011 |
| WO | 2013/123104 A1 | 8/2013 |
| WO | 2015/038117 A1 | 3/2015 |

OTHER PUBLICATIONS

Kakadjian, S., et al. "Crosslinked emulsion to be used as fracturing fluids." SPE International Symposium on Oilfield Chemistry. Society of Petroleum Engineers, 2001.

* cited by examiner

BUFFERED FRICTION REDUCER FOR SUBTERRANEAN OPERATIONS

CROSS-REFERENCE TO RELATED APPLICATION

The present application is a U.S. National Stage Application of International Application No. PCT/US2016/042520 filed Jul. 15, 2016, which is incorporated herein by reference in its entirety for all purposes.

BACKGROUND

The present disclosure relates to systems and methods for treating subterranean formations.

Treatment fluids may be used in a variety of subterranean treatments. Such treatments include, but are not limited to, stimulation treatments. As used herein, the term "treatment," or "treating," refers to any subterranean operation that uses a fluid in conjunction with a desired function and/or for a desired purpose. The term "treatment," or "treating," does not necessarily imply any particular action by the fluid.

One production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore.

In certain approaches, hydraulic fracturing may use a cross-linked polymer to increase the viscosity of the fracturing fluid. The relatively high viscosity of such a fluid may, among other benefits, help transport the proppant particulates to the desired location within the formation and/or allow the fracturing fluid to be loaded with a higher concentration of proppant particulates. Once at least one fracture is created and the proppant particulates are substantially in place, the viscosity of the fracturing fluid usually is reduced, and the fracturing fluid may be recovered from the formation. The treatment fluid that is recovered is known as a flow-back fluid.

An alternative type of hydraulic fracturing, known as slickwater hydraulic fracturing, does not use a cross-linked polymer. The fracturing fluid has a relatively low viscosity as a result. Slickwater fracturing may be used to generate a narrow, complex fractures with low concentrations of proppants. Because the viscosity of the fracturing fluid is relatively low, the proppant transport is achieved by increasing the pumping rate and pressure of the fracturing fluid. During pumping, significant energy loss can occur due to the friction between the fracturing fluid and the casing or tubing, particularly when the fracturing fluid is in turbulent flow.

A friction reducer is often introduced to the treatment fluid during slickwater fracturing operations to minimize such energy consumption. The friction reducer is typically an uncross-linked polymer because crosslinking often reduces the polymer's ability to suppress friction during pumping operations and in fact often results in increased friction. The friction reducer facilitates laminar flow of the treatment fluid, which causes less frictional forces and energy loss than turbulent flow of the same fluid.

BRIEF DESCRIPTION OF THE DRAWINGS

These drawings illustrate certain aspects of some of the embodiments of the present disclosure, and should not be used to limit or define the claims.

Figure 1:
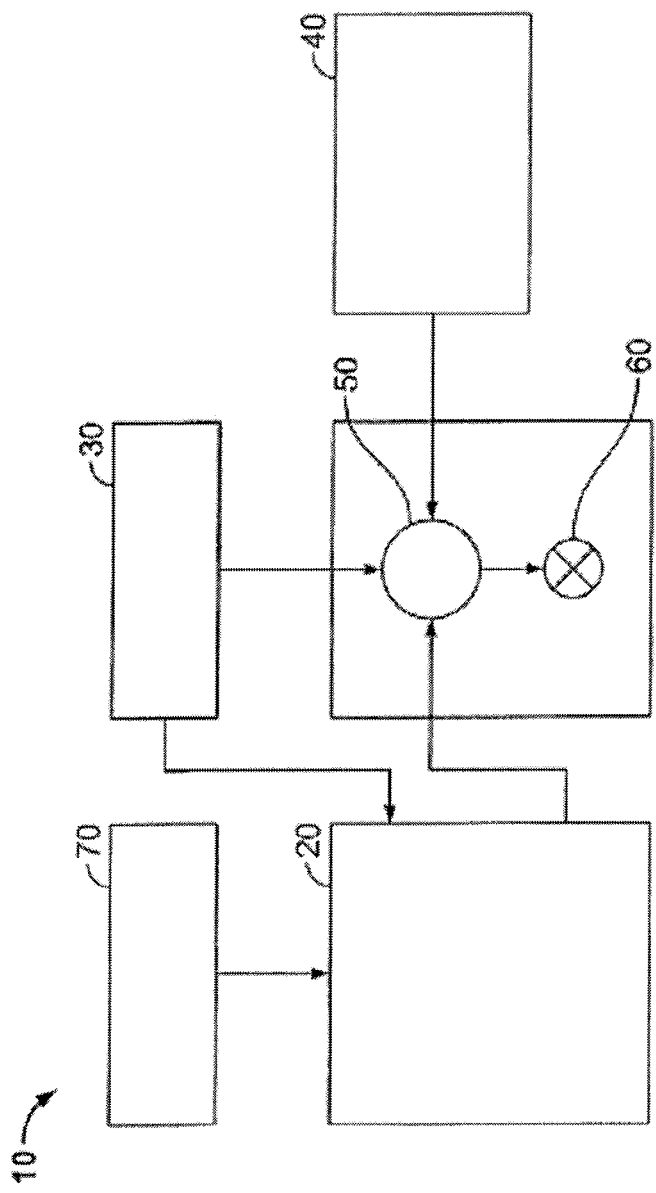
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods comprising friction reducer compositions for use in subterranean treatment fluids.

In accordance with embodiments of the present disclosure, a treatment fluid may comprise an aqueous base fluid, a friction reducer, and an alkaline buffering agent. The treatment fluid may comprise additional components, including but not limited to, proppants, surfactants, scale inhibitors, biocides, corrosion inhibitors, clay control, breakers, and any combination thereof. In certain embodiments, the treatment fluid may be used for slickwater hydraulic fracturing.

There may be several potential advantages to the methods and compositions of the present disclosure, only some of which are alluded to herein. The use of a friction reducer may be beneficial in treatment fluids, particularly because it can reduce energy loss that results from the friction between the treatment fluid and the casing or tubing. However, when produced water is re-used in the treatment fluid, the pH can fluctuate and decrease in value. This is particularly the case for produced water with varying salinities, which may be up to 300,000 ppm. In turn, the decrease in pH tends to have a negative impact on the performance of the friction reducer. Accordingly, it can be advantageous for the friction reducer system to have a pH buffering agent in the fluid, among other reasons, to maintain the effectiveness of the friction reducer.

The aqueous base fluid used in embodiments of the treatment fluids of the present disclosure may comprise fresh water, saltwater (e.g., water containing one or more salts dissolved therein), brine (e.g., saturated saltwater), seawater, or any combination thereof. Generally, the water may be from any source, provided that it does not contain components that might adversely affect the stability and/or performance of the treatment fluids of the present disclosure. One of ordinary skill in the art, with the benefit of this disclosure, will recognize what components might adversely affect the stability and/or performance of the treatment fluids of the present disclosure.

The friction reducer used in the treatment fluids of the present disclosure comprises one or more nonionic, anionic, cationic, and/or amphoteric polymers. As used herein, unless the context otherwise requires, a "polymer" or "polymeric material" includes homopolymers, copolymers, terpolymers, etc. In addition, the term "copolymer" as used herein is not limited to the combination of polymers having two monomeric units, but includes any combination of monomeric units, for example, terpolymers, tetrapolymers, etc. In certain embodiments, the friction reducer comprises a polymeric chain without side chains.

In certain embodiments, the friction reducer comprises high molecular weight, linear polymers. Examples of polymers that may be suitable include, but are not limited to, polyacrylamide, polyacrylamide derivatives, polyacrylamide co-polymers, and any combination thereof. Those of ordinary skill in the art will appreciate that the friction reducing polymer(s) included in the treatment fluid should have a molecular weight sufficient to provide a desired level of friction reduction. In general, polymers having higher molecular weights may be needed to provide a desirable level of friction reduction. In certain embodiments, the friction reducer has a molecular weight in the range of about 5,000 Daltons ("Da") to about 999,000,000 Da. In other embodiments, the friction reducer has a molecular weight in the range of about 1,000,000 Da to about 50,000,000 Da. In other embodiments, the friction reducer has a molecular weight in the range of about 3,000,000 Da to about 10,000,000 Da. Those of ordinary skill in the art will recognize that friction-reducing polymers having molecular weights outside the listed range may still provide some degree of friction reduction. Typically, friction-reducing polymers are linear and flexible.

The friction reducer may be present in a treatment fluid in an amount sufficient to provide a desirable level of friction reduction. In certain embodiments, the friction reducer is present in a treatment fluid in an amount sufficient to maintain laminar flow when the treatment fluid is pumped into the well bore and/or subterranean formation. For example, in some embodiments, the friction reducer may be present in the treatment fluid in an amount of from about 100 to about 100,000 parts per million ("ppm"). In other example embodiments, the friction reducer may be present in the treatment fluid in an amount of from about 100 to about 5,000 ppm, or in other embodiments, from about 500 to about 2,000 ppm. In such embodiments, an amount of friction reducer on the higher end of the above ranges may be desired.

Friction reducers that may be suitable include those that reduce energy losses due to turbulence within the treatment fluid. Without limiting the disclosure to any particular theory or mechanism, the friction reducer may decrease the energy loss that occurs when the treatment fluid is pumped at a high pumping rate or pressure. It is believed that the friction reducer helps maintain the laminar flow (as opposed to turbulent flow) of the treatment fluid. Laminar flow experiences reduced friction and, therefore, the treatment fluid suffers from less energy losses caused by this friction.

The alkaline buffering agent used in the treatment fluids of the present disclosure comprises a buffer that maintains the pH of the treatment fluid above in a range of about 7 to about 10. In certain embodiments, the buffer maintains the pH of the treatment fluid in a range of about 8 to about 10. Examples of alkaline buffering agents that may be suitable include bicarbonate salts, carbonate salts, sodium or potassium hydroxides, high pH chelating agents (such as ethylenediaminetetraacetic acid, i.e., EDTA), and high pH surfactants (such as an alkoxylated sulfate or an alkoxylated carboxylate). In certain embodiments, the alkaline buffering agent may comprise sodium bicarbonate or sodium carbonate (soda ash). In certain embodiments, the alkaline buffering agent may comprise potassium bicarbonate or potassium carbonate. A person of skill in the art, with the benefit of this disclosure, would be able to a select an alkaline buffering agent that may be suitable for a particular application of the present disclosure.

In certain embodiments, the buffering agent may comprise an alkaline surfactant that is used in an emulsion. An emulsion is a fluid including a dispersion of immiscible liquid particles in an external liquid phase. In these embodiments, the aqueous base fluid of the treatment fluid forms an external phase and the treatment fluid may further comprise an internal oil phase. In these embodiments, the alkaline surfactant may serve two functions of controlling the pH of the treatment fluid and maintaining the dispersion of the internal oil phase by reducing the interfacial tension between the external aqueous phase and the internal oil phase.

The alkaline buffering agent may be present in a treatment fluid in an amount sufficient to maintain a desired pH when the treatment fluid is pumped into the well bore and/or subterranean formation. For example, in some embodiments, the alkaline buffering agent may be present in the treatment fluid in an amount of from about 1 to about 300,000 ppm. In other example embodiments, the alkaline buffering agent may be present in the treatment fluid in an amount of from about 100 to about 200,000 ppm, or in other embodiments, from about 500 to about 3,000 ppm. In such embodiments, an amount of alkaline buffering agent on the higher end of the above ranges may be desired.

The treatment fluids of some embodiments may include particulates (such as proppant particulates or gravel particulates) suitable for use in subterranean applications. Particulates that may be suitable for use in certain embodiments of the present disclosure may comprise any material suitable for use in subterranean operations. Proppant particulates may be used in conjunction with hydraulic fracturing to prevent the fractures from fully closing upon the release of hydraulic pressure, forming conductive channels through which fluids may flow to the wellbore.

Particulate materials that may be suitable in certain embodiments include, but are not limited to, sand, bauxite, ceramic materials, glass materials, polymer materials, TEFLON® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The particulate size generally may range from about 2 mesh to about 400 mesh on the U.S. Sieve Series; however, in certain circumstances, other sizes may be desired and will be entirely suitable for practice of the present disclosures. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof.

Moreover, fibrous materials, that may or may not be used to bear the pressure of a closed fracture, are often included in fracturing and sand control treatments. In certain embodiments, the particulates included in the treatment fluids of some embodiments of the present disclosure may be coated with any suitable resin or tackifying agent known to those of ordinary skill in the art.

The present disclosure also provides methods for using the treatment fluids to carry out a variety of subterranean treatments, including but not limited to, hydraulic fracturing treatments. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing). In some embodiments, the treatment fluid may flow back to the surface.

In certain embodiments, the step of introducing the treatment fluid into the subterranean formation may further comprise a step of designing or determining a fracturing treatment for a treatment zone of the subterranean formation. For example, a step of designing can comprise: (a) determining the design temperature and design pressure; (b) determining the total designed pumping volume of the one or more treatment fluids to be pumped into the subterranean formation at a rate and pressure above the fracture pressure of the subterranean formation; (c) designing a treatment fluid, including its composition and rheological characteristics; (d) designing the pH of the treatment fluid; (e) determining the size of a proppant of a proppant pack previously formed or to be formed in fractures in the subterranean formation; or (f) designing the loading of any proppant in the treatment fluid. In one embodiment, for example, a person of skill in the art with the teachings of this disclosure may determine a concentration of alkaline buffering agent based on the designed pH of the treatment fluid.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30.

The proppant source 40 can include a proppant for combination with the fracturing fluid. The system may also include additive source 70 that provides one or more additives (e.g., gelling agents, weighting agents, friction reducers, buffering agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
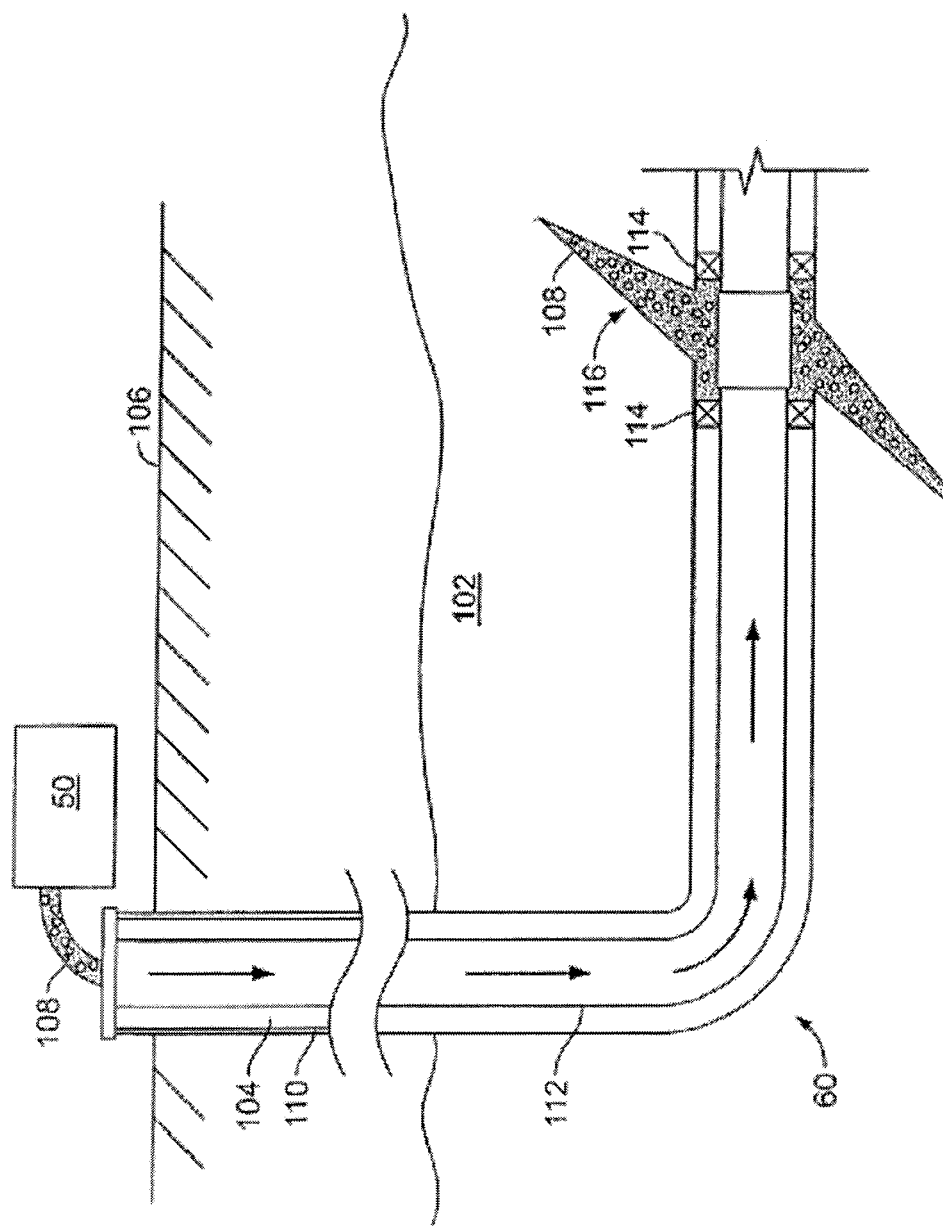
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: (A) providing a treatment fluid comprising: an aqueous base fluid, a friction reducer, and an alkaline buffering agent, wherein the treatment fluid has a pH in the range of about 7 to about 10; and (B) injecting the treatment fluid into a wellbore penetrating at least a portion of a subterranean formation at a pressure sufficient to create or enhance one or more fractures within the subterranean formation. Optionally, the friction reducer comprises a linear polymer with a molecular weight greater than about 5,000 Daltons. Optionally, the friction reducer comprises at least one polymer selected from the group consisting of: a polyacrylamide, a polyacrylamide derivatives, a polyacrylamide co-polymer, and any combination thereof. Optionally, the alkaline buffering agent comprises at least one salt selected from the group consisting of: a bicarbonate salt, a carbonate salt, sodium hydroxide, potassium hydroxide, a chelating agent, a surfactant, and any combination thereof. Optionally, the alkaline buffering agent comprises at least one salt selected from the group consisting of: a bicarbonate salt, a carbonate salt, and any combination thereof. Optionally, the treatment fluid further comprises a plurality of proppant particles. Optionally, the treatment fluid is injected into the wellbore using one or more pumps.

Another embodiment of the present disclosure is a method comprising: (A) providing a treatment fluid emulsion comprising: an external phase that comprises an aqueous base fluid, a friction reducer, an alkaline buffering agent comprising a surfactant, and an internal oil phase, wherein the external phase of the treatment fluid emulsion has a pH in the range of about 7 to about 10; and (B) injecting the treatment fluid emulsion into a wellbore penetrating at least a portion of a subterranean formation at a pressure sufficient to create or enhance one or more fractures within the subterranean formation. Optionally, the friction reducer comprises a linear polymer with a molecular weight greater than about 5,000 Daltons. Optionally, the friction reducer comprises at least one polymer selected from the group consisting of: a polyacrylamide, a polyacrylamide derivatives, a polyacrylamide co-polymer, and any combination thereof. Optionally, the alkaline buffering agent further comprises at least one salt selected from the group consisting of: a bicarbonate salt, a carbonate salt, a sodium hydroxide, a potassium hydroxide, a chelating agent, and any combination thereof. Optionally, the alkaline buffering agent comprises at least one surfactant selected from the group consisting of: an alkoxylated sulfate, an alkoxylated carboxylate, and any combination thereof. Optionally, the treatment fluid emulsion further comprises a plurality of proppant particles. Optionally, the treatment fluid emulsion is injected into the wellbore using one or more pumps.

Another embodiment of the present disclosure is a composition comprising: an aqueous base fluid, a friction reducer, and an alkaline buffering agent comprising a salt selected from the group consisting of: a bicarbonate salt, a carbonate salt, sodium hydroxide, potassium hydroxide, a chelating agent, a surfactant, and any combination thereof, wherein the composition has a pH in the range of about 7 to about 10. Optionally, the friction reducer comprises a linear polymer with a molecular weight greater than about 5,000 Daltons. Optionally, the friction reducer comprises a polymer selected from the group consisting of: a polyacrylamide, a polyacrylamide derivatives, a polyacrylamide co-polymer, and any combination thereof. Optionally, the alkaline buffering agent comprises ethylenediaminetetraacetic acid. Optionally, the alkaline buffering agent comprises a surfactant selected from the group consisting of: an alkoxylated sulfate, an alkoxylated carboxylate, and any combination thereof. Optionally, the composition further comprises a plurality of proppant particles.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    (A) providing a treatment fluid comprising:
        an aqueous base fluid,
        a friction reducer, and
        an alkaline buffering agent,
        wherein the treatment fluid has a pH in the range of about 7 to about 10; and
    (B) injecting the treatment fluid into a wellbore penetrating at least a portion of a subterranean formation at a pressure sufficient to create or enhance one or more fractures within the subterranean formation.

2. The method of claim 1 wherein the friction reducer comprises a linear polymer with a molecular weight greater than about 5,000 Daltons.

3. The method of claim 2 wherein the friction reducer comprises at least one polymer selected from the group consisting of: a polyacrylamide, a polyacrylamide derivatives, a polyacrylamide co-polymer, and any combination thereof.

4. The method of claim 1 wherein the alkaline buffering agent comprises at least one salt selected from the group consisting of: a bicarbonate salt, a carbonate salt, sodium hydroxide, potassium hydroxide, a chelating agent, a surfactant, and any combination thereof.

5. The method of claim 1 wherein the alkaline buffering agent comprises at least one salt selected from the group consisting of: a bicarbonate salt, a carbonate salt, and any combination thereof.

6. The method of claim 1 wherein the treatment fluid further comprises a plurality of proppant particles.

7. The method of claim 1 wherein the treatment fluid is injected into the wellbore using one or more pumps.

8. A method comprising:
(A) providing a treatment fluid emulsion comprising:
an external phase that comprises an aqueous base fluid,
a friction reducer,
an alkaline buffering agent comprising a surfactant, and
an internal oil phase,
wherein the external phase of the treatment fluid emulsion has a pH in the range of about 7 to about 10; and
(B) injecting the treatment fluid emulsion into a wellbore penetrating at least a portion of a subterranean formation at a pressure sufficient to create or enhance one or more fractures within the subterranean formation.

9. The method of claim 8 wherein the friction reducer comprises a linear polymer with a molecular weight greater than about 5,000 Daltons.

10. The method of claim 9 wherein the friction reducer comprises at least one polymer selected from the group consisting of: a polyacrylamide, a polyacrylamide derivatives, a polyacrylamide co-polymer, and any combination thereof.

11. The method of claim 8 wherein the alkaline buffering agent further comprises at least one salt selected from the group consisting of: a bicarbonate salt, a carbonate salt, a sodium hydroxide, a potassium hydroxide, a chelating agent, and any combination thereof.

12. The method of claim 8 wherein the alkaline buffering agent comprises at least one surfactant selected from the group consisting of: an alkoxylated sulfate, an alkoxylated carboxylate, and any combination thereof.

13. The method of claim 8 wherein the treatment fluid emulsion further comprises a plurality of proppant particles.

14. The method of claim 8 wherein the treatment fluid emulsion is injected into the wellbore using one or more pumps.

* * * * *